(12) United States Patent
Copeland et al.

(10) Patent No.: US 7,701,343 B2
(45) Date of Patent: *Apr. 20, 2010

(54) ANTENNA FOR A COMBINATION EAS/RFID TAG WITH A DETACHER

(75) Inventors: Richard L. Copeland, Lake Worth, FL (US); Gary Mark Shafer, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/666,811

(22) PCT Filed: Nov. 2, 2005

(86) PCT No.: PCT/US2005/039840

§ 371 (c)(1),
(2), (4) Date: Apr. 30, 2007

(87) PCT Pub. No.: WO2006/050462

PCT Pub. Date: May 11, 2006

(65) Prior Publication Data

US 2007/0262865 A1    Nov. 15, 2007

Related U.S. Application Data

(60) Provisional application No. 60/624,402, filed on Nov. 2, 2004, provisional application No. 60/659,288, filed on Mar. 7, 2005.

(51) Int. Cl.
  *G08B 13/14* (2006.01)
(52) U.S. Cl. .............. 340/572.1; 340/572.2; 340/572.3; 340/572.7; 340/572.8; 340/572.9; 24/704.1; 24/704.2; 70/57.1

(58) Field of Classification Search .............. 340/572.1, 340/572.7, 572.8, 572.9, 572.3, 551, 568.1, 340/825.54; 70/57.1, 391, 416, 454, 453; 24/704.1, 704.2
See application file for complete search history.

(56) References Cited

U.S. PATENT DOCUMENTS 5,955,951 A * 9/1999 Wischerop et al. ........ 340/572.8
6,281,794 B1 * 8/2001 Duan et al. ............... 340/572.1

FOREIGN PATENT DOCUMENTS

JP       2002290141       * 10/2002

* cited by examiner

*Primary Examiner*—George A Bugg
*Assistant Examiner*—Sisay Yacob
(74) *Attorney, Agent, or Firm*—Alan M. Weisberg; Christopher & Weisberg, P.A.

(57) ABSTRACT

A security device detaches a combination electronic article surveillance (EAS) and radio frequency identification (RFID) tag (EAS/RFID tag), and includes a detacher (magnet) to selectively disengage a clutch release disposed in a first portion of the combination EAS/RFID tag, a near field circular microstrip antenna configured to electronically read information stored in a second portion of the combination EAS/RFID tag. The antenna encircles the detacher and reads information from the second portion of the combination EAS/RFID tag at a position relative to the detacher when the second portion of the tag is disposed at any angle relative to the detacher and only when the detacher is positioned to disengage the clutch release. As long as the portion of the EAS/RFID tag containing the clutch end mechanism is located over the detaching magnet, the RFID label is in a valid detection zone regardless of its orientation relative to the antenna.

20 Claims, 9 Drawing Sheets

ANTENNA FOR A COMBINATION EAS/RFID TAG WITH A DETACHER

CROSS-REFERENCE TO RELATED APPLICATIONS

This application claims the benefit of priority under 35 U.S.C. §119 of U.S. Provisional Patent Application 60/624,402 by Shafer et al, entitled "NEAR FIELD PROBE FOR READING RFID TAGS AND LABELS AT CLOSE RANGE", filed on Nov. 2, 2004 and U.S. Provisional Patent Application 60/659,289 by Copeland et al, entitled "LINEAR MONOPOLE MICROSTRIP RFID NEAR FIELD ANTENNA", filed on Mar. 7, 2005, the entire contents of which are incorporated by reference herein.

BACKGROUND

1. Technical Field

This disclosure relates to the field of electronic article surveillance (EAS) and radiofrequency identification (RFID) tags and more particularly, to a RFID read antenna for a combination EAS and RFID tag.

2. Background of Related Art

The use of a combination EAS/RFID security tag offers an added benefit of inventory control capability along with the traditional anti-theft deterrence from the EAS technology. The combination EAS/RFID security tag may be attached to clothing items using a pin attachment mechanism. This attachment mechanism may be removed by a detacher that may employ a magnetic means to release the pin.

It is advantageous to read the RFID information when the pin is being removed. Furthermore, it may be of interest to enable the removal of the pin by first reading and verifying the RFID information.

To detach the pin of the combination EAS/RFID security tag, the user places the end of the tag in a defined center region of the detacher. It should be noted that the security tag may rotate about the detacher magnet region at any arbitrary angle. Therefore, the orientation of the RFID element with respect to the detacher center may be quite arbitrary. If the RFID element must be read in this position, then either the detachment orientation needs to be fixed in order to allow a fixed position RFID near-field antenna to read exactly at this fixed position or a new omni-directional RFID near-field antenna is needed.

Therefore, there exists a need for the development of an RFID read antenna which enables a combination EAS/RFID hard tag to be detached and read consistently and accurately at all times independently of the angle of the EAS/RFID tag relative to the RFID antenna.

SUMMARY

It is an object of the present disclosure to provide an RFID read antenna which enables a combination EAS/RFID hard tag to be detached and read consistently and accurately at all times independently of the angle of the EAS/RFID tag relative to the RFID antenna.

It is an object of the present disclosure to provide a near field antenna which can be used in combination with a combination EAS/RFID hard tag having a read/write range limited to a near field distance $$d << \frac{\lambda}{2\pi}.$$

It is an object of the present disclosure to provide a near field antenna in which the majority of the field energy of the near field antenna is dissipated in a terminating load resistor and not radiated far away from the antenna.

It is an object of the present disclosure to provide a near field antenna exhibiting a low Q factor compared to a radiating far field antenna, which therefore results in a wide operating bandwidth which is useful for wide band worldwide ultrahigh frequency (UHF) applications.

It is an object of the present disclosure to provide a near field antenna with simplified RFID reader electronics without the need for frequency hopping.

It is an object of the present disclosure to provide a near field antenna which exhibits low radiation resistance and radiation efficiency compared to a radiating antenna, thereby improving compliance with the U.S. Federal Communications Commission (FCC) and other worldwide regulatory requirements.

It is an object of the present disclosure to provide a near field circular microstrip antenna which creates an E field which is radially oriented outside of the circular microstrip area where the electric field couples readily to the RFID element of the combination EAS/RFID security tag.

It is an object of the present disclosure that the circular diameter of the near field antenna should correspond to that between a half-wavelength to a full-wavelength dipole.

It is an object of the present disclosure to provide a near field antenna for which compliance with Federal Communication Commission (FCC) regulatory requirements is facilitated due to near field localization of fields, i.e. the electric field intensity decays more rapidly away from the near field antenna than would the intensity decay for a radiating antenna.

It is an object of the present disclosure to provide a circular microstrip near field antenna which can use either a monopole or dipole feed excitation with essentially identical RFID detection capability.

The present disclosure relates to a security device for detaching a combination electronic article surveillance (EAS) and radio frequency identification (RFID) tag (EAS/RFID tag). The security device includes a detacher configured to selectively disengage a clutch release disposed in a first portion of the combination EAS/RFID tag, and a near field antenna configured to electronically read information stored in a second portion of the combination EAS/RFID tag. The near field antenna is configured to substantially encircle the detacher and is configured to read information from the second portion of the combination EAS/RFID tag at a position relative to the detacher when the second portion of the tag is disposed at any angle relative to the detacher. The near field antenna is configured to read information only when said detacher is positioned to disengage the clutch release in the first portion of the combination EAS/RFID tag. The detacher may magnetically disengage the clutch release. In one embodiment, the near field antenna is configured to only read information when the detacher is positioned to disengage the clutch release in the first portion of the combination EAS/RFID tag. The antenna may be a substantially circular microstrip antenna. The antenna may further include a substrate; a feed port mounted on the substrate; and a terminating resistor mounted on the substrate, wherein the feed port is coupled to a first portion of the antenna and the terminating resistor is coupled to a second portion of the antenna. In one embodiment, the substantially circular microstrip antenna has a diameter of about $c/\{\pi f(\in_r)^{1/2}\}$, where c is the speed of light ($3 \times 10^8$ meters/second), f is the operating frequency (cycles/second), and $\in_r$ is the relative permittivity of the substrate.

In another embodiment of the present disclosure, the present disclosure relates to a security device for detaching combination electronic article surveillance (EAS) and radio frequency identification (RFID) tags (EAS/RFID tags), and includes a detacher having an axis defined therethrough. The detacher is configured to selectively disengage a clutch release disposed in a first portion of the combination EAS/RFID tag. The security device includes also a substantially circular-shaped microstrip near field antenna configured to electronically read information stored in a second portion of the combination EAS/RFID tag. The near field antenna is configured to substantially encircle the detacher and is configured to read information from the second portion of the combination EAS/RFID tag when said combination EAS/RFID tag is positioned at any angle relative to said axis.

The present disclosure relates also to an antenna for use with a combination electronic article surveillance (EAS) and radiofrequency identification (RFID) tag. The antenna includes a substrate; a substantially circular microstrip mounted on the substrate; and a detacher magnet having a substantially circular perimeter, with the substantially circular microstrip being mounted on the substrate around the perimeter of the detacher magnet. The antenna further may include a feed port mounted on the substrate; and a terminating resistor mounted on the substrate, wherein the feed port is coupled to a first portion of the antenna and the terminating resistor is coupled to a second portion of the antenna. The substantially circular microstrip may have a diameter of about $c/\{\pi f(\in_r)^{1/2}\}$ where c is the speed of light ($3 \times 10^8$ meters/second), f is the operating frequency (cycles/second), and $\in_r$ is the relative permittivity of the substrate.

The antenna may include a ground plane and the circular antenna microstrip is mounted on a first surface of the substrate and a second surface of the substrate is mounted on the ground plane, and the feed port is coupled to a first portion of the antenna and the terminating resistor is coupled to a second portion of the antenna and to the ground plane. In one embodiment, the detacher magnet has a substantially circular perimeter and is disposed in proximity to the second surface of the substrate such that the substantially circular microstrip is disposed outside the perimeter of the detacher magnet.

The second portion of the combination EAS/RFID security tag includes an RFID element which resides substantially outside the perimeter of the circular microstrip antenna.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

The present disclosure will be understood more fully from the detailed description given below and from the accompanying drawings of particular embodiments of the disclosure which, however, should not be taken to limit the disclosure to a specific embodiment but are for explanatory purposes.

Numerous specific details may be set forth herein to provide a thorough understanding of a number of possible embodiments of a near field RFID read antenna for a combination EAS/RFID tag according to the present disclosure. It will be understood by those skilled in the art, however, that various embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of any embodiments disclosed herein.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments disclosed herein are not necessarily limited in this context.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
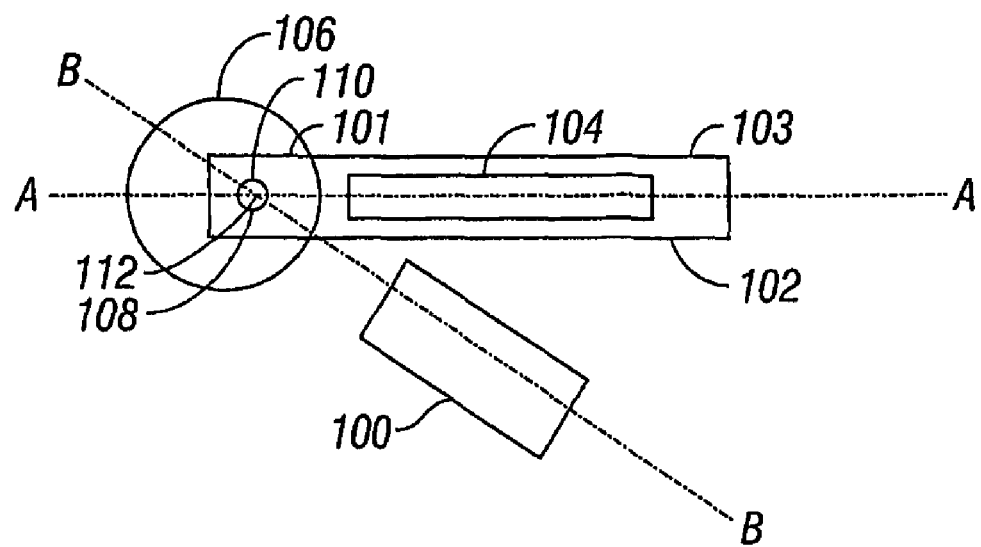
FIG. 1 illustrates a combination EAS/RFID hard tag with a detacher magnet and a prior art RFID read antenna with the hard tag in a first orientation with respect to the RFID read antenna.

FIG. 1 illustrates a prior art RFID read antenna 100 positioned with respect to a combination EAS/RFID hard tag 102. The EAS/RFI) hard tag 102 includes a clutch release mechanism 108 disposed in a first or tag head portion 101 of the combination RFID/EAS tag 102. The EAS/RFID hard tag 102 includes a RFID read element 104 disposed in a second or RFID element portion 103 of the EAS/RFID hard tag 102. The clutch release mechanism 108 typically provides an EAS deactivation function to release a pin 112 of a detacher magnet 106 disposed on an article (not shown) typically for surveillance purposes. The pin 112 attaches the magnet 106 to the article and to the clutch release mechanism 108. Therefore, the clutch release mechanism 108 functions as a detacher. In this prior art configuration, the RFID read antenna 100 is a near field general dipole microstrip antenna which extends along an axis B-B linearly to and through magnet 106. This particular combination EAS/RFID tag 102 also has a substantially linear configuration and includes a longitudinal axis A-A which extends therealong and to magnet 106. Axes A-A and B-B intersect at a common point, i.e., at the central point 110 of magnet 106, such that the axes A-A and B-B form an angle $\theta$ with respect to each other. Typically, the central point 110 is the position at which the clutch release mechanism 108 releases the pin and magnet 106. As illustrated in FIG. 1, the angle $\theta$ is of such a magnitude that the RFID element portion 104 of the EAS/RFID tag 102 is out of range of the RFID read antenna 100 and so the RFID information stored in the RFID element portion 104 cannot be read. Nevertheless, the clutch release mechanism 108 can be activated by the detacher magnet 106 without therefore first reading the RFID element portion 104 information.

Figure 2:
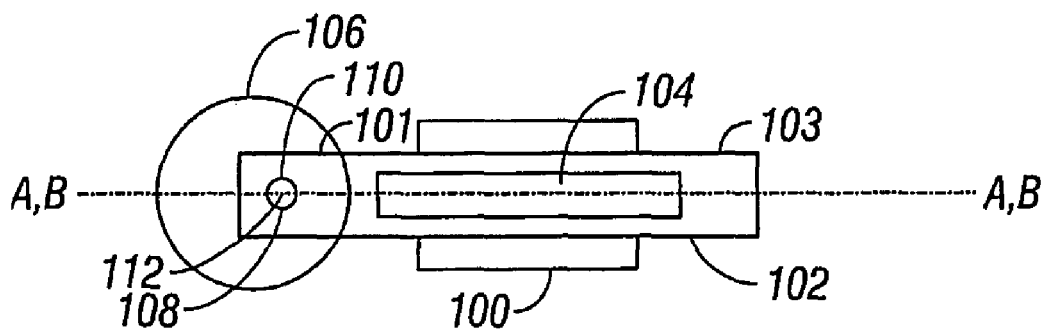
FIG. 2 illustrates the combination EAS/RFID hard tag with a detacher magnet and RFID read antenna of FIG. 1 with the hard tag in a second orientation with respect to the RFID read antenna.

FIG. 2 illustrates the combination EAS/RFID hard tag 102 with the detacher magnet 106 and RFID read antenna 100 of FIG. 1 with the hard tag 102 in a second orientation with respect to the RFID read antenna 100. More particularly, since the axis A-A of the combination EAS/RFID hard tag 102 is oriented in a parallel position with respect to the axis B-B of the RFID read antenna 100, the angle $\theta$ is now 0° and so the RFID elements of the combination EAS/RFID hard tag 102 are positioned directly over the RFID read antenna 100. In this position, the RFID read element 104 disposed in the RFID read element portion 103 is within the near field of the RFID read antenna 100, and the RFID information can be read while at the same time, the clutch release mechanism 108 can be activated by the detacher magnet 106 to release the pin 112 without therefore first reading the information of the RFID read element 104.

As can be appreciated by the prior art teachings, the magnetic release clutch mechanism 108 of the EAS portion 101 is enabled when the clutch release mechanism 108 is directly over the magnet 106 irrespective of the position of the RFID element 104. Mechanism 108 can be activated to release the pin with the help of the detacher magnet 106. Thus, there is no assurance that the RFID information is gathered at the point of sale. In other words, the RFID read element 104 contained in the hard tag 102 is read only when directly over, or substantially directly over, the RFID read antenna 100 as shown in FIG. 2. The obvious disadvantage of this approach is that the user, e.g., typically a person responsible for preventing loss of the article, must ensure that the RFID element 104 in the hard tag 102 is directly over the RFID read antenna 100 at all times to ensure that the RFID information is gathered.

Figure 3:
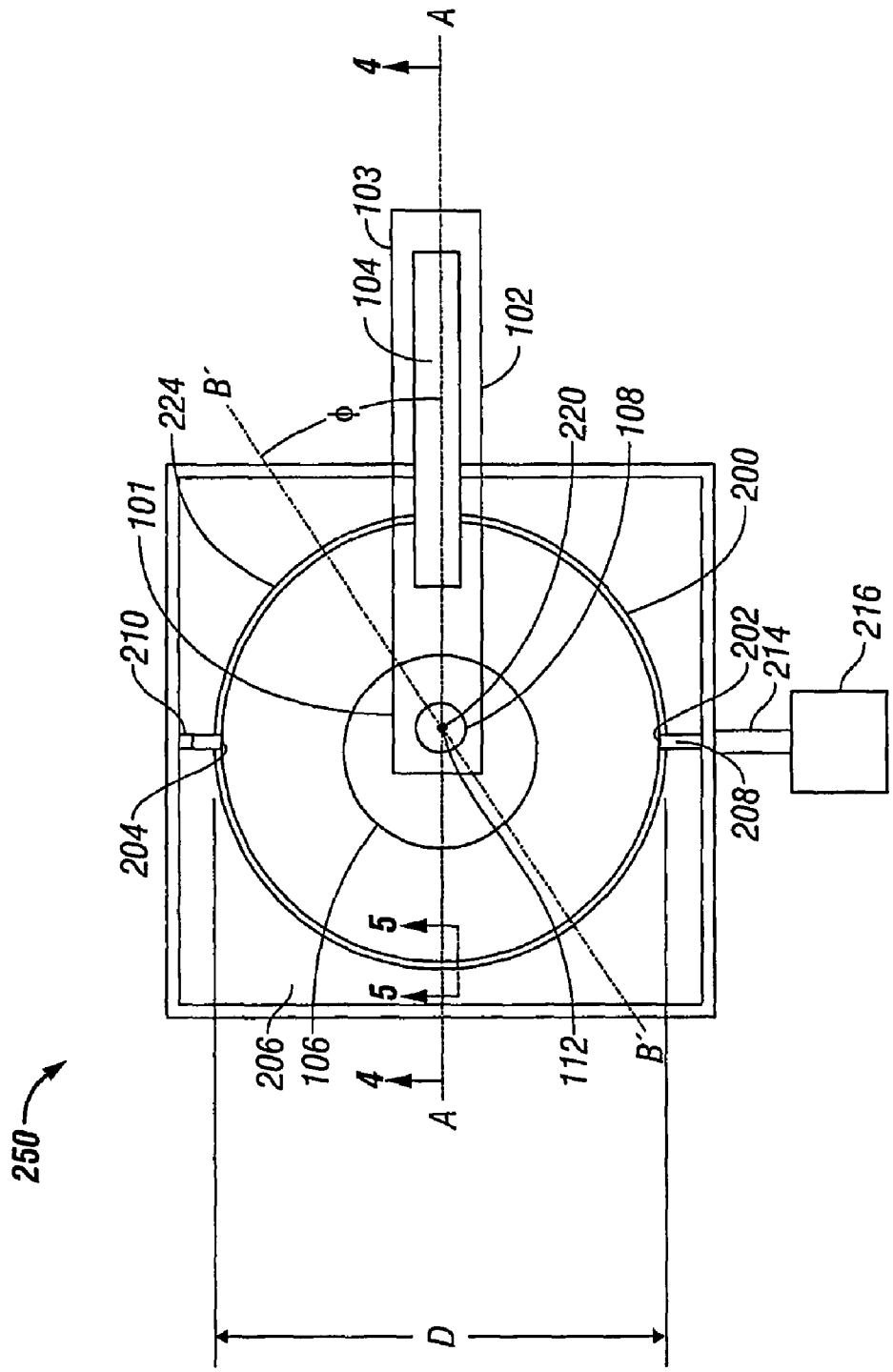
FIG. 3 illustrates a combination EAS/RFID hard tag with a detacher magnet and an RFID read antenna according to the present disclosure.

Turning now to the details of the present disclosure, FIG. 3 shows a security device 250 which includes the combination EAS/RFID hard tag 102 with the detacher magnet 106 and an RFID read antenna 200 according to the present disclosure. The antenna 200 includes a substantially circular microstrip configuration of generally two semicircular arcuate portions 222 and 224. The antenna 200 is mounted typically on a substrate 206. A feed port 208, which is also mounted on the substrate 206, supplies a feed signal via a cable 214, which may be a coaxial cable, to the antenna 200 and is coupled to the antenna 200 at a first position 202. A terminating resistor 210, which is also mounted on the substrate 206, is coupled to the antenna 200 at a second position 204. In one embodiment, the first position 202 and the second position 204 are substantially diametrically opposed to one another. In one embodiment, the antenna 200 substantially encircles the detacher magnet 106. The detacher magnet 106 has a center point 220. The antenna 200 and the detacher magnet 106 may be concentric. The embodiments are not limited in this context. The combination EAS/RFID tag 102 has a configuration such that a first axis A'-A' is defined therethrough extending from the first or tag head portion 101 through to the RFID read element portion 103. As illustrated in FIG. 3, the combination EAS/RFID hard tag 102 is positioned so that the axis A'-A' intersects center 220 of magnet 106 for the sake of illustration purposes.

A second axis B'-B' is defined through the detacher magnet 106 for explanatory purposes such that axes A'-A' and B'-B' intersect over the center point 220 and define a variable angle $\phi$ therebetween. Either of the axes A'-A' and B'-B' may be rotated with respect to the other axis such that the angle $\phi$ may be varied from 0 degrees to 360 degrees.

Figure 4:
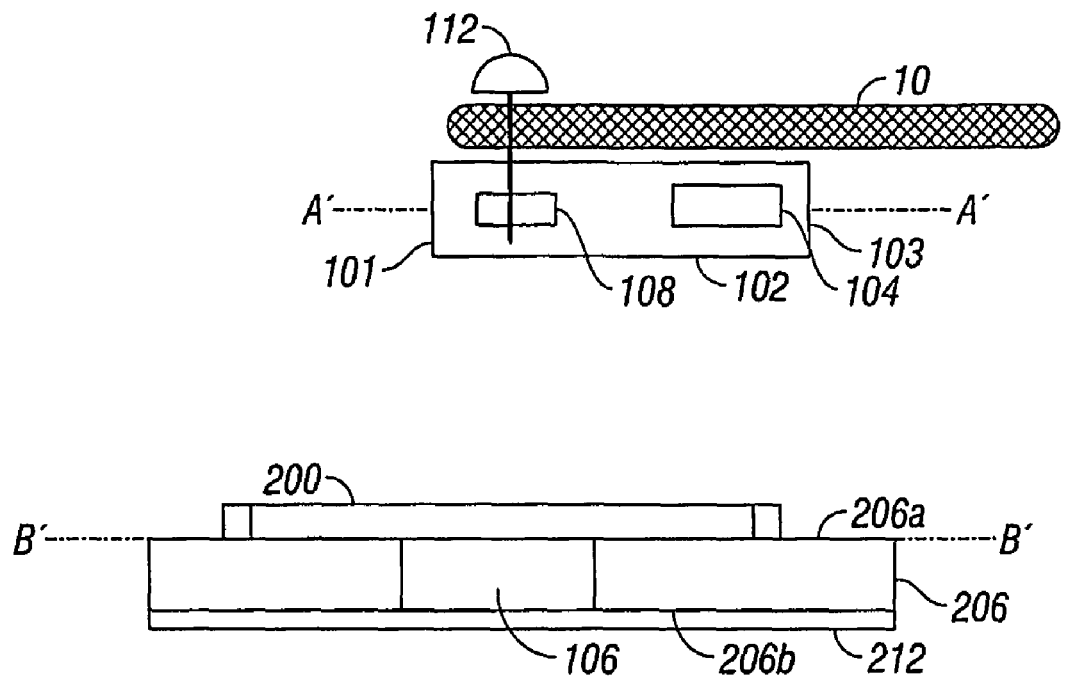
FIG. 4 is a cross-sectional elevation view of the combination EAS/RFID hard tag with a detacher magnet and an RFID read antenna taken along line 4-4 of FIG. 3.
Figure 5:
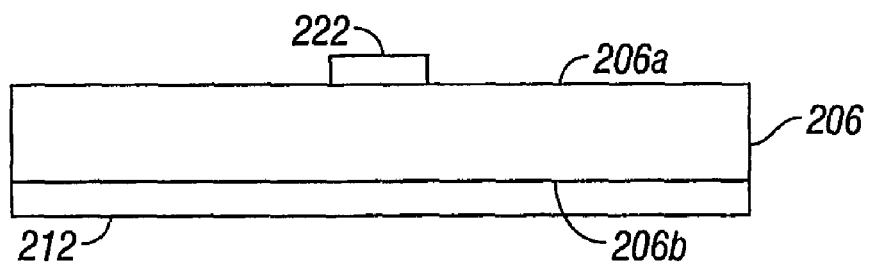
FIG. 5 is a cross-sectional elevation view of the combination EAS/RFID hard tag with a detacher magnet and an RFID read antenna taken along line 5-5 of FIG. 3.

As illustrated in FIGS. 3, 4 and 5, the substrate 206 includes typically an upper or first surface 206a and typically a lower or second surface 206b. The antenna 200 is mounted or disposed on the first surface 206a. The second surface 206b of the substrate 206 is mounted or disposed on a ground plane 212. The cable 214 includes a first terminal which is coupled or connected to the antenna 200 to feed power to the two antenna semicircular portions 222 and 224, and a second terminal which is coupled or connected to the ground plane 212. In addition to being coupled to the antenna 200, the terminating resistor 210 extends to and couples to the ground plane 212. Therefore, as illustrated in FIGS. 4 and 5, the antenna 200 is configured to operate as a monopole antenna, so that the feed port 208 is excited by a monopole feed excitation signal.

As discussed previously, the pin 112 of the combination EAS/RFID tag 102 attaches to an article, which is illustrated as article 10 in FIG. 4. The EAS/RFID tag 102 includes the clutch release mechanism 108 and the RFID read element 104 which are disposed at the first or tag head portion 101 and the second or RFID element portion 103 of the EAS/RFID tag 102, respectively. The clutch release mechanism 108 releases the tag 102 from the article when in proximity to the detacher magnet 106. More particularly, the pin 112 is released from the article 10 when the tag head 101 is placed in the detacher 106, allowing the article 10 to be released from the EAS/RFID security tag 102.

In one embodiment, according to the present disclosure, the detacher magnet 106 has a substantially circular perimeter and is mounted in and substantially at the center of the substrate 206. The antenna 200 is configured such that when the EAS/RFID tag 200 is disposed at any angle $\phi$ with respect to the antenna 200, and the clutch release mechanism 108 is placed in proximity to the detacher magnet 106, the RFID antenna element 104 is readable by the antenna 200. More particularly, the read range of antenna 200 is independent of angle φ as the pin 112 and clutch release mechanism 108 are centered substantially over the center point 220 of the detacher magnet 106 and the combination (EAS/RFID security) tag 102 is rotated about the center point 220. The clutch release mechanism 108 need not be precisely over the center point 220 to enable actuation of the clutch release mechanism 108.

The clutch release mechanism 108 may not be only magnetic but may be any type of EAS detacher, including but not limited to an electrically operated solenoid or pneumatically or hydraulically operated release mechanisms.

It is particularly noteworthy that the antenna 200 has a consistent read range of zero degrees to about 360 degrees.

It is envisioned that the circular microstrip antenna 200 may be considered as part of a combined EAS and RFID system 250 which includes the aforedescribed combination EAS/RFID tag 102, antenna 200 and detacher magnet 106. The EAS/RFID tag 102 is configured to be attached to the article 10.

As disclosed previously, but herein with respect to the system 250, the antenna 200 is configured such that when the EAS/RFID tag 102 is disposed at any angle φ with respect to the antenna 200, and the clutch release mechanism 108 is placed in proper proximity to the detacher magnet 106 enabling detachment, the RFID antenna element 104 is readable by the RFID read antenna 200

As part of the system 250, the features and limitations of the antenna 200 are essentially identical to those described previously.

Those skilled in the art will recognize that other configurations of microstrip antenna 200 are possible including but not limited to shapes which are elliptical or oval, triangular, square, rectangular, parabolic or hyperbolic, curvilinear, polygonal, or irregular.

It has been determined that the electric field that couples to the RFID element 104 in the combination EAS/RFID hard tag 102 is radially oriented outside and above the circular microstrip 200, making the combination EASIRFID hard tag 102 easily detectable even if the hard tag 102 is placed at any angle φ with respect to the magnet center or origin 220. It is envisioned that the read range may be optimized at a point when the clutch mechanism 108 is positioned over, or is relatively proximate to, the detacher magnet 106.

Turning now to a more detailed discussion of the microstrip antenna 200, antenna 200 is similar to two $$\frac{\lambda}{2}$$

microstrips configured as circular arcs so that the signal wavelength λ corresponds to $$\frac{\lambda}{2}.$$

Therefore, as illustrated in FIG. 3, the circular diameter "D" of the near field antenna 200 should correspond to that between a half-wavelength to a full-wavelength dipole. Since the circular microstrip antenna 200 is deposited on the dielectric substrate 206, the radius a should be in the range of $a=c/\{2\pi f(\in_r)^{1/2}\}$ for the minimal value associated with the half-wavelength case and twice that for the full-wavelength case. Here c is the speed of light ($3\times10^8$ meters/second), f is the operating frequency (cycles/second), and $\in_r$ is the relative permittivity of the dielectric substrate material.

Figure 6:
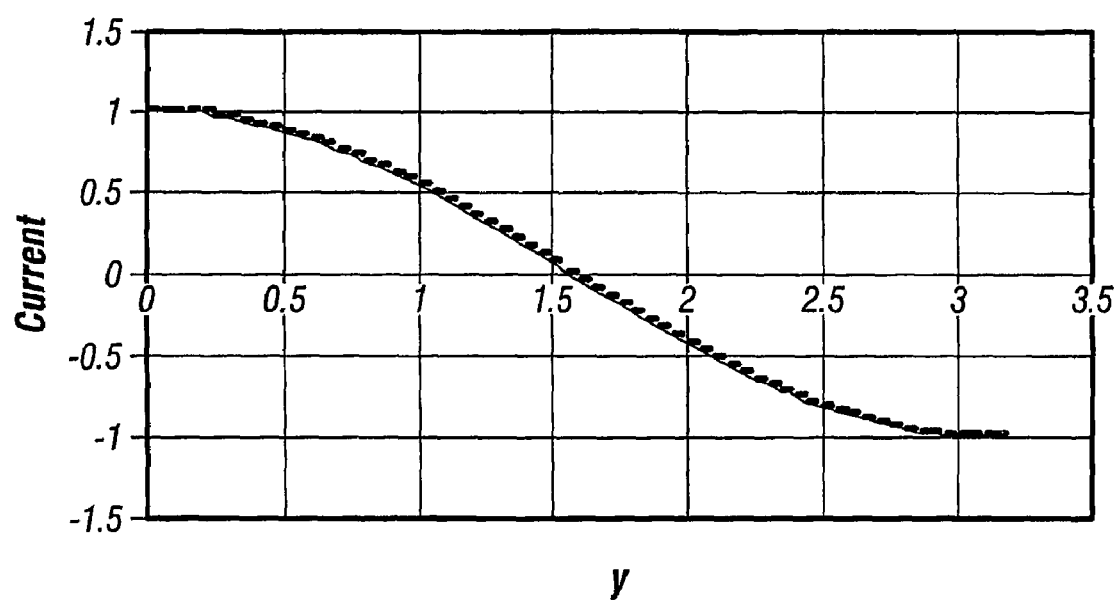
FIG. 6 is a graphical representation of the current along the RFID read antenna of FIGS. 3, 4 and 5.
Figure 7:
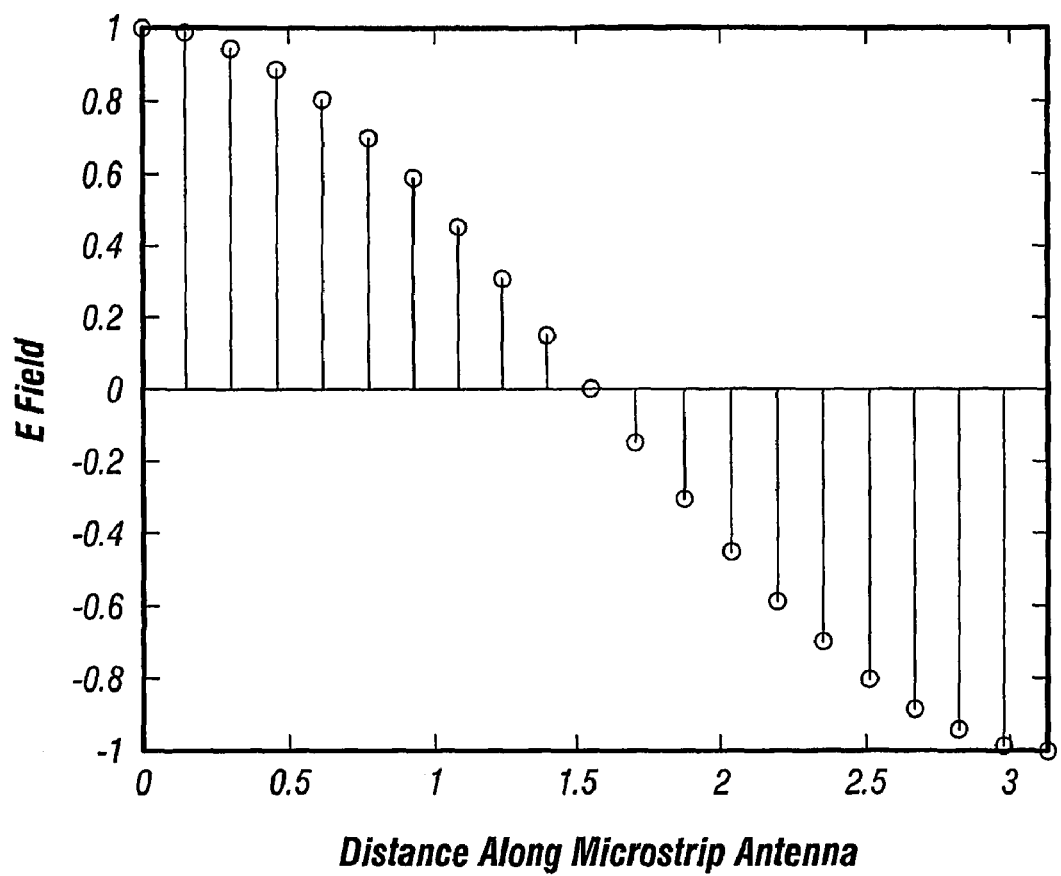
FIG. 7 is a graphical representation of a half-wave electric field (E-field) distribution above the RFID read antenna of FIG. 3.
Figure 8:
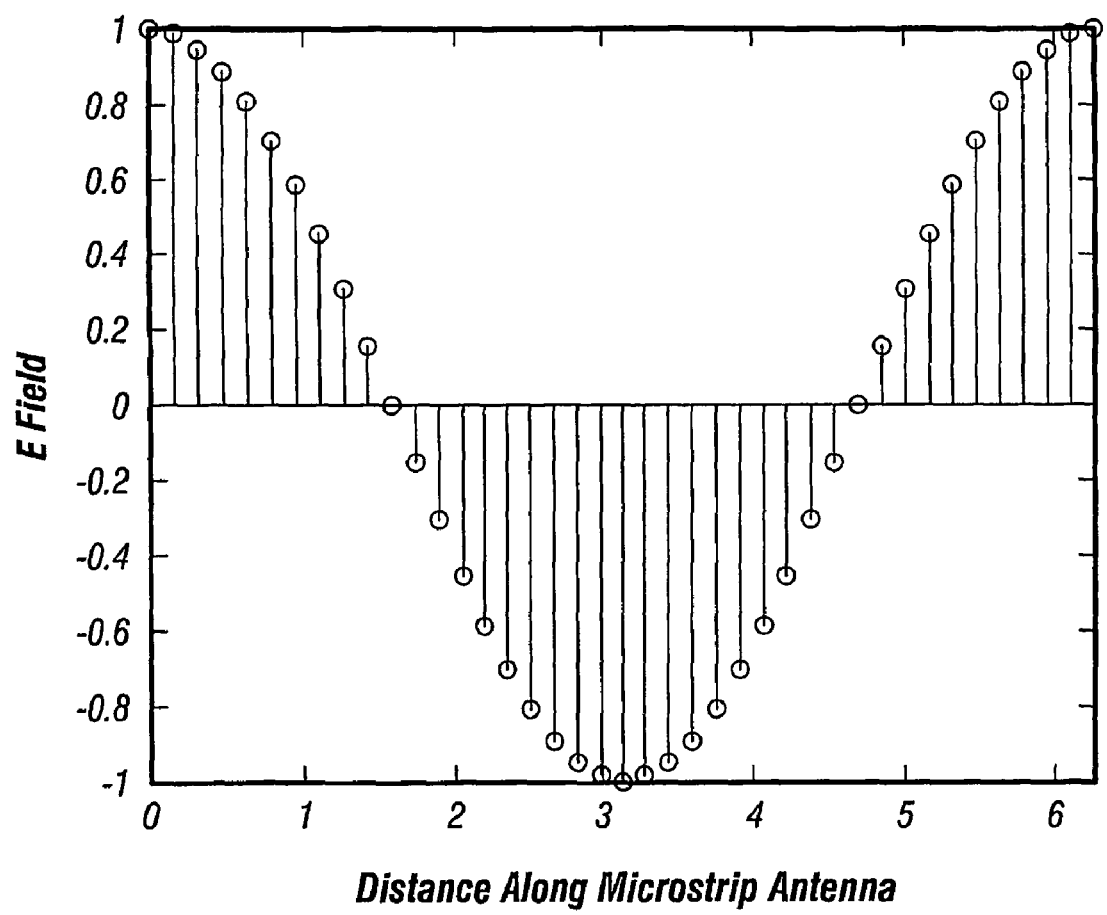
FIG. 8 is a graphical representation of a full-wave E-field distribution above the RFID read antenna of FIG. 3 at zero degrees phase.

Referring to FIGS. 6, 7 and 8, the effective length of each circular arc 222 and 224 may be in the range of a half-wavelength up to a full wavelength. As illustrated specifically in FIG. 6, in the half-wavelength configuration, the antenna current I is maximum and positive ($+I_0$) at the feed or input end 208, decreases to zero at the mid-point and is minimum and negative ($-I_0$) at the end position of the terminating resistor 210. Therefore, in the half-wavelength configuration, the antenna current goes through a phase change of 180 degrees from the input 208 to the end position of the terminating resistor 210. As illustrated in FIG. 7, the E-field at the feed point 208 is at a maximum. At the midpoint along the microstrip antenna portions 112 along the length L, the E field decreases to zero. At the termination end 118, the E field decreases to a negative peak or maximum.

As illustrated specifically in FIG. 8, for the full-wavelength configuration, the antenna current is maximum and positive at the input end 208, decays to zero a quarter of the way, then increases in a negative direction to a minimum and negative value half way, decays through zero at three quarters of the way and then increases in a positive direction back to a positive maximum at the end position of the terminating resistor 210.

The signal for the antenna 200 to read is substantially enhanced when the E-field coupling to the RFID element 104 is maximized. Such conditions occur when the RFID element 104 resides substantially outside of the perimeter of the semicircular arcuate portions 222 and 224 which form the circular antenna 200, as illustrated in FIGS. 3 and 4. In addition, the signal is enhanced when the combination EAS/RFID hard tag 102 is oriented substantially radially with respect to the center 220 of the detacher magnet 106 such that the linear axis B'-B' of the EAS/RFID hard tag 102 substantially overlaps the center 220.

Figure 9:
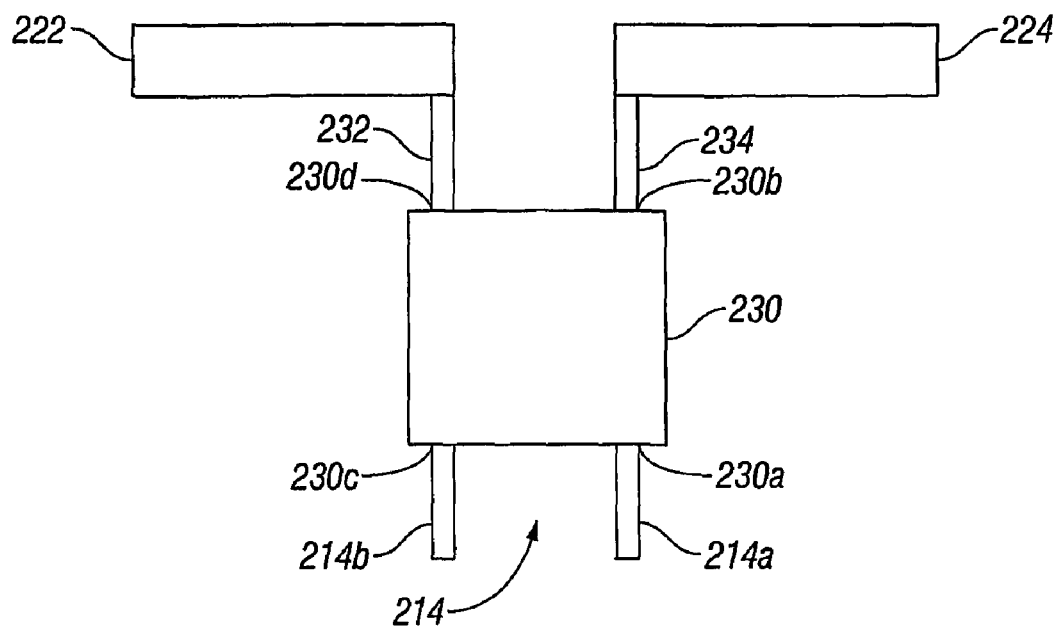
FIG. 9 illustrates a dipole feed for the RFID read antenna of FIGS. 3, 4 and 5.

FIG. 9 illustrates an alternate embodiment of the circular microstrip antenna 200. More particularly, the circular microstrip antenna 200 is configured in a dipole configuration. A first terminal 214a of cable 214 is connected to a voltage transformer 230 at a transformer input signal connection 230a. The input signal from the signal connection 230a is output from the transformer 230 at transformer output signal connection 230b where it is coupled via cable or connector 234 to semicircular arcuate portion 224.

A second terminal 214b of cable 214 is connected to the transformer 230 via an input signal ground connection 230c. The input signal ground is output from the semicircular arcuate portion 222 to transformer 230 via a connection 230d. Therefore, in this configuration, the semicircular portions 222 and 224 operate as a dipole antenna, so that the feed port 208 is excited by a dipole feed excitation signal.

Figure 10:
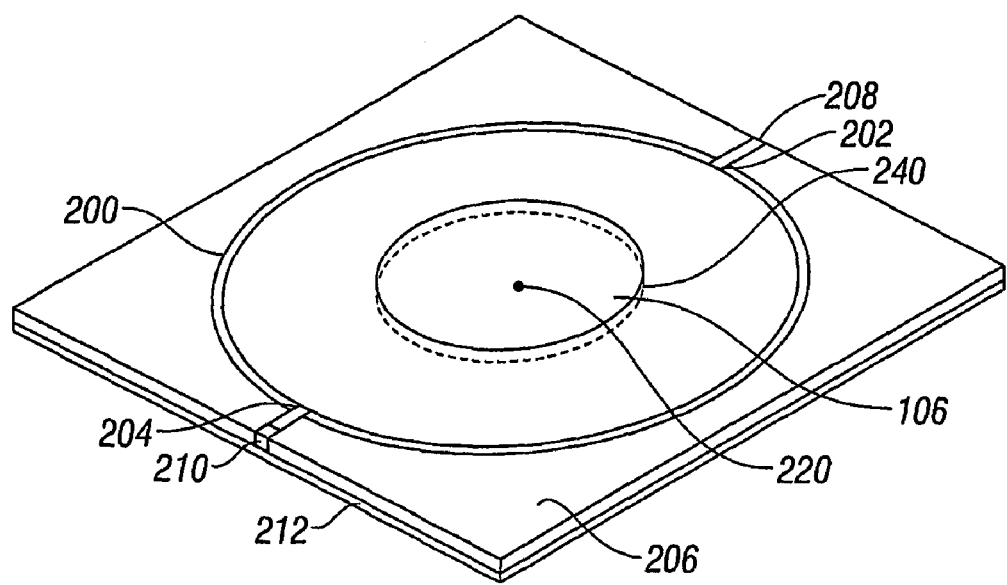
FIG. 10 is a top perspective view of one embodiment of the RFID read antenna and detacher magnet of FIGS. 3, 4 and 5.

FIG. 10 is a top perspective view of one embodiment of the security device 250 wherein the microstrip antenna 200 is disposed on substrate 206. The detacher magnet 106 is disposed through an aperture 240 which is substantially centered around the center 220 of the detacher magnet 106. The aperture 240 penetrates the substrate 206 and the ground plane 212. The substantially circular microstrip 200 is mounted on the substrate 206 around the perimeter of the detacher magnet 106. The terminating resistor 210 is coupled to the microstrip antenna 200 and to the ground plane 212.

Figure 11:
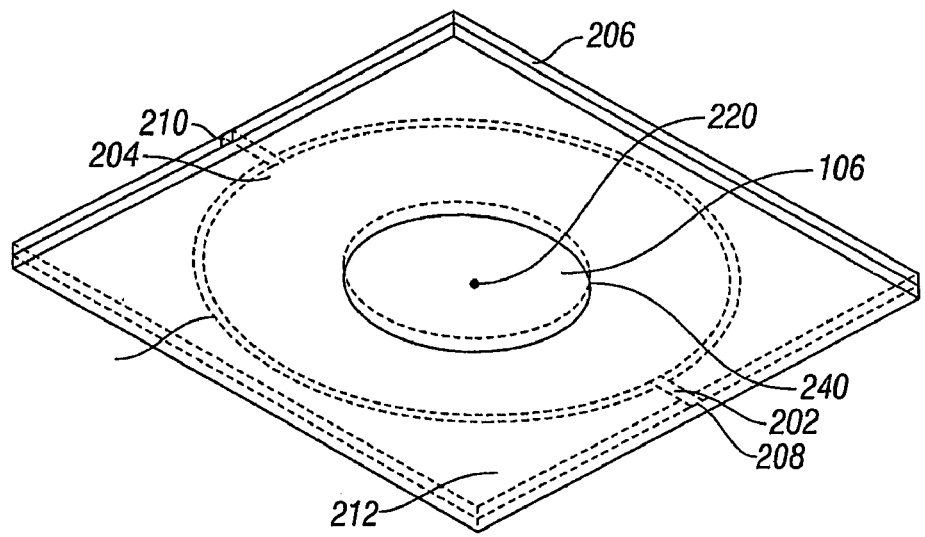
FIG. 11 is a bottom perspective view of the RFID read antenna and detacher magnet illustrated in FIG. 10.

FIG. 11 is a bottom perspective view of the security device 250 as illustrated in FIG. 10. More particularly, the detacher magnet 106 penetrates the ground plane 212 and the substrate 206 via the aperture 240.

Figure 12:
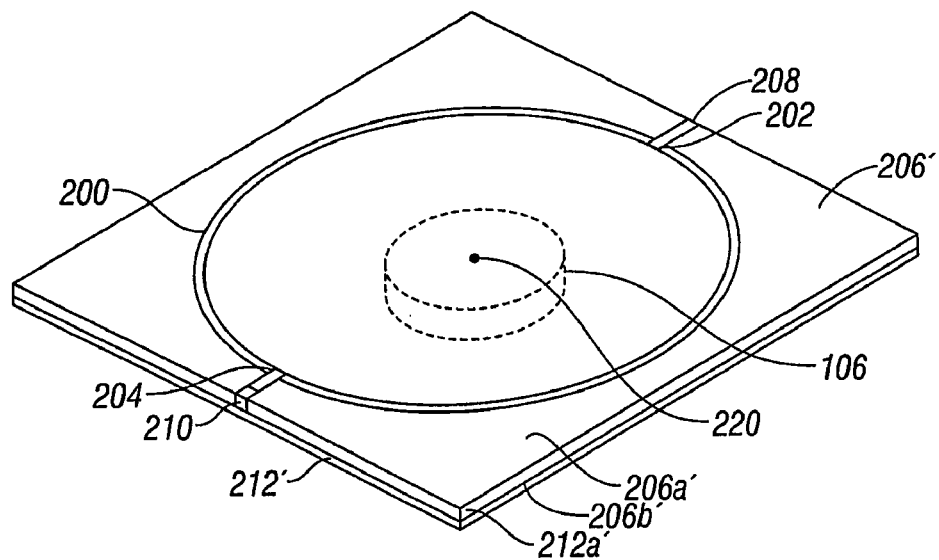
FIG. 12 is a top perspective view of an alternate embodiment of the RFID read antenna and detacher magnet of FIGS. 3, 4 and 5.
Figure 13:
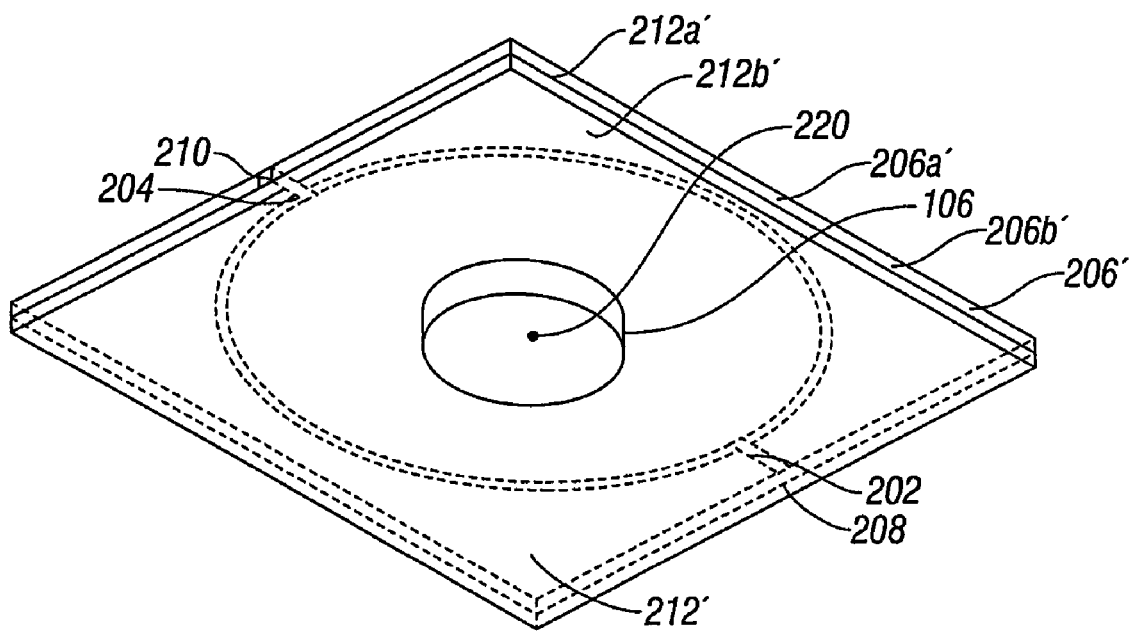
FIG. 13 is a bottom perspective view of the alternate embodiment of the RFID read antenna and detacher magnet illustrated in FIG. 12.

FIG. 12 is a top perspective view of an alternate embodiment of the substrate 206 and ground plane 212. FIG. 13 is a bottom perspective view of the alternate embodiment of the substrate 206 and ground plane 212 illustrated in FIG. 13. More particularly, the substantially circular microstrip antenna 200 is disposed on a solid substrate 206' and a solid ground plane 212' which exclude the aperture 240. The substrate 206' includes first and second surfaces 206a' and 206b'. The ground plane 212' includes first and second surfaces 212a' and 212b'. The substantially circular microstrip 200 is mounted on the first surface 206a' of the substrate. The detacher magnet 106, which has a substantially circular perimeter, is disposed in proximity to the second surface 206b' of the substrate 206, and to the second surface 212b' of the ground plane 212', such that the substantially circular microstrip 200 is disposed outside the perimeter of the detacher magnet 106. Since the detacher magnet 106 is not confined by the aperture 240, the detacher magnet 106 is unrestrained and movable with respect to the microstrip 200. The operation and performance of the detacher magnet 106 with respect to the clutch release mechanism 108 are substantially equivalent whether the detacher magnet 106 is confined by the aperture 240 or whether the detacher magnet 106 is unrestrained and movable with respect to the microstrip 200.

It has been determined that the characteristics of the circular near field RFID microstrip antenna 200 are optimized as follows:

a. A read/write range which is limited to a near field distance $$d \ll \frac{\lambda}{2\pi}.$$

Having a read/write range d limited to a near field distance of $d \ll \lambda/2\pi$ allows the security device 250 to perform both EAS hard tag detachment and RFID information gathering at the point of sale. Since the read range is very small, the EAS detachment and RFID information gathering are limited to one tag at a time. In other words, at such a read range, the deactivator will not detect extraneous RFID information from other tags in close proximity.

b. A majority of energy supplied to the antenna 200 is dissipated in the terminating load resistor 210, thereby reducing the level of interference generated.

c. A near field antenna 200 that exhibits a low Q factor compared to a radiating far field antenna. The Q factor is a measure of the −3 db bandwidth divided by the center frequency or $$Q = \frac{F2 - F1}{Fc},$$

where F2 is the upper frequency −3 db point and F1 is the lower frequency −3 db point and Fc is the center frequency.

d. The low Q factor results in a wide operating bandwidth which is useful for wide band worldwide UHF applications.

e. As is known in the art, frequency hopping is a technique used to prevent readers from interfering with one another. In the United States, UHF RFID readers actually operate between 902 and 928 MHz, even though it is said that they operate at 915 MHz. The readers may jump randomly or in a programmed sequence to any frequency between 902 MHz and 928 MHz. If the band is wide enough, the chances of two readers operating at exactly the same frequency is small. The UHF bands in Europe and Japan are much smaller so this technique is not effective for preventing reader interference.

The wide operating bandwidth and low Q factor of the RFID system 250 and antenna 200 of the present disclosure allow simplified RFID reader electronics without the need for frequency hopping.

f. A near field antenna 200 that exhibits low radiation resistance and radiation efficiency, thereby reducing interference and facilitating compliance with FCC regulatory limits as compared to a radiating antenna.

g. The circular microstrip near field antenna 200 creates an E field which is radially oriented outside of the circular microstrip area.

h. As previously discussed, the circular microstrip near field antenna 200 has a diameter dimension "D" of approximately "2a", or $$D = 2a = 2c/\{2\pi f(\mathcal{E}_r)^{1/2}\}$$

for the minimal value associated with the half-wavelength case and twice that for the full-wavelength case.

i. Compliance with regulatory requirements is facilitated due to localization of emitted E-fields to the near field.

j. The circular microstrip near field antenna 200 can use either a monopole or dipole feed excitation with essentially identical RFID detection capability. More particularly, the feed port 208 can be excited by one of a monopole and dipole feed excitation signal.

k. Enhancing the coupling of the radial E field to the RFID element 104 enhances the effectiveness of the read signal. Such conditions occur when the RFID element 104 resides substantially outside of the perimeter of the circular microstrip antenna 200.

In summary, the RFID label component, i.e., RFID read element 104 of the combined EAS/RFID tag 102 is insensitive to detection over the area of the detacher magnet 106 but it is physically close to the antenna 200 so that it is well within the near field. As long as the portion of the EAS/RFID tag 102, i.e. the tag head 101, containing the clutch end mechanism 108 is located is over the detaching magnet 106, the RFID label 102 is in a valid detection zone regardless of its orientation relative to the antenna 200.

It is considered that one particular advantage of the present disclosure is that it may reduce the tag placement requirements since it will be practically impossible to release the clutch mechanism 108 without reading the RFID information on the RFID antenna element 104 of the combination tag 102.

As can be appreciated, the relative size and shape of the antenna 200 may be configured to operate with any size or shaped tags or labels. However, it is envisioned that the present disclosure will operate very well with long combination tags 102 with the RFID element antenna 104 disposed along the length of the combination tag 102 and substantially outside the perimeter of the circular antenna 200.

Since the radial electric field extends outwardly away from the center 220 of the detacher magnet 106 in a radial manner from the periphery of the antenna 200, the RFID read element 104 of the combination EAS/RFID security tag 102 should extend substantially outside of the antenna 200 when the first portion 101 of the tag 102 is placed in proximity to the center region 220 of the detacher magnet 106. Since the radial electric field which extends inwardly in a radial manner from the periphery of the antenna 200 and towards the center 220 of the detacher magnet 106 reverses direction as compared to the direction of the radial electric field which extends outwardly away from the center 220 of the detacher magnet 106 in a radial manner from the periphery of the antenna 200, it is not desirable for the RFID element 104 to be positioned in a manner so that either the RFID element 104 or the RFID element portion 103 are equally divided in interfacing relationship with the microstrip of the antenna 200, as the result would be no net differential electric field across the REID element 104.

While certain features of the embodiments have been illustrated as described herein, many modifications, substitutions, changes and equivalents may occur to those skilled in the art. It is therefore to be understood that the appended claims are intended to cover all such modifications and changes as fall within the true spirit of the embodiments.

What is claimed is:

1. A security device for detaching a combination electronic article surveillance (EAS) and radio frequency identification (RFID) tag (EAS/RFID tag), said security device comprising:
    a detacher configured to selectively disengage a clutch release disposed in a first portion of the combination EAS/RFID tag; and
    a near field substantially circular microstrip antenna configured to electronically read information stored in a second portion of the combination EAS/RFID tag, said near field antenna configured to substantially encircle said detacher and configured to read information from said second portion of the combination EAS/RFID tag at a position relative to said detacher when said second portion of said tag is disposed at any angle relative to said detacher.

2. A security device according to claim 1, wherein the near field antenna is configured to read information only when said detacher is positioned to disengage the clutch release in the first portion of the combination EAS/RFID tag.

3. A security device according to claim 1, wherein the detacher magnetically disengages the clutch release.

4. A security device according to claim 3, wherein the near field antenna is configured to only read information when said detacher is positioned to disengage the clutch release in the first portion of the combination EAS/RFID tag.

5. A security device according to claim 1, wherein the security device further comprises:
    a substrate, the substrate having a first surface and a second surface;
    a feed port mounted on the substrate;
    a terminating resistor mounted on the substrate; and
    a ground plane,
    wherein the circular antenna microstrip is mounted on the first surface of the substrate and the second surface of the substrate is mounted on the ground plane, and
    wherein the feed port is coupled to a first portion of the antenna and the terminating resistor is coupled to a second portion of the antenna and to the ground plane.

6. A security device according to claim 5 wherein the substantially circular microstrip has a diameter ranging from about $c/\{2\pi f(\in_r)^{1/2}\}$ to about $c/\{\pi f(\in_r)^{1/2}\}$, where c is the speed of light ($3\times10^8$ meters/second), f is the operating frequency (cycles/second), and $\in_r$ is the relative permittivity of the substrate.

7. A security device according to claim 6, wherein the feed port is excited by one of a monopole and a dipole feed excitation signal.

8. A security device according to claim 1, wherein the second portion of the combination EAS/RFID tag includes an RFID element and the RFID element resides substantially outside of the perimeter of the circular microstrip antenna.

9. A security device for detaching combination electronic article surveillance (EAS) and radio frequency identification (RFID) tags (EAS/RFID tags), said security device comprising:
    a detacher having an axis defined therethrough, said detacher configured to selectively disengage a clutch release disposed in a first portion of the combination EAS/RFID tag;
    a substantially circular-shaped monopole microstrip near field antenna configured to electronically read information stored in a second portion of the combination EAS/RFID tag, said near field antenna configured to substantially encircle said detacher and configured to read information from said second portion of the combination EAS/RFID tag when said combination EAS/RFID tag is positioned at any angle relative to said axis.

10. A security device according to claim 9, wherein the near field antenna is configured to only read information when said detacher is positioned to disengage the clutch release in the first portion of the combination EAS/RFID tag.

11. A security device according to claim 9, wherein the detacher magnetically disengages the clutch release.

12. A security device according to claim 11, wherein the near field antenna is configured to read information only when said detacher is positioned to disengage the clutch release in the first portion of the combination EAS/RFID tag.

13. A security device according to claim 9, wherein the security device further comprises:
    a substrate, the substrate having a first surface and a second surface;
    a feed port mounted on the substrate;
    a terminating resistor mounted on the substrate; and
    a ground plane,
    wherein
    the circular antenna microstrip is mounted on the first surface of the substrate and the second surface of the substrate is mounted on the ground plane, and
    the feed port is coupled to a first portion of the antenna and the terminating resistor is coupled to a second portion of the antenna and to the ground plane.

14. An antenna for use with a combination electronic article surveillance (EAS) and radiofrequency identification (RFID) tag, the tag being removable from an article by a detacher, the antenna comprising
    a substrate;
    a substantially circular microstrip mounted on the substrate; and
    the antenna configured to electronically read information stored in an RFID portion of the combination EAS/RFID tag, said antenna configured to substantially encircle said detacher and configured to read information from said RFID portion of the combination EAS/RFID tag at a position relative to said detacher when said RFID portion of said tag is disposed at any angle relative to said detacher.

15. A security device according to claim 9, the detacher further comprising:
    a detacher magnet having a substantially circular perimeter, the substantially circular microstrip being mounted on the substrate around the perimeter of the detacher magnet.

16. A security device according to claim 9, further comprising a substrate, the substrate comprises first and second surfaces, the substantially circular microstrip being mounted on the first surface of the substrate, and wherein the antenna further comprises a detacher magnet having a substantially circular perimeter, the detacher magnet being disposed in proximity to the second surface of the substrate such that the substantially circular microstrip is disposed outside the perimeter of the detacher magnet.

17. An antenna according to claim 14, wherein the antenna further comprises:

a feed port mounted on the substrate; and a terminating resistor mounted on the substrate, wherein the feed port is coupled to a first portion of the antenna and the terminating resistor is coupled to a second portion of the antenna.

18. An antenna according to claim 17, wherein the substrate comprises first and second surfaces, wherein the antenna further comprises:

a ground plane, and wherein the circular antenna microstrip is mounted on the first surface of the substrate and the second surface of the substrate is mounted on the ground plane, and the feed port is coupled to a first portion of the antenna and the terminating resistor is coupled to a second portion of the antenna and to the ground plane.

19. An antenna according to claim 17, wherein the feed port is excited by one of a monopole and dipole feed excitation signal.

20. An antenna according to claim 14, wherein the substantially circular microstrip has a diameter ranging from about $c/\{2\pi f(\in_r)^{1/2}\}$ to about $c/\{\pi f(\in_r)^{1/2}\}$, where c is the speed of light ($3\times10^8$ meters/second), f is the operating frequency (cycles/second), and $\in_r$ is the relative permittivity of the substrate.

* * * * *